United States Patent
Kolouri et al.

(10) Patent No.: US 12,008,079 B1
(45) Date of Patent: Jun. 11, 2024

(54) PROCESS TO MAKE MACHINE OBJECT DETECTION ROBUST TO ADVERSARIAL ATTACKS

(71) Applicant: HRL Laboratories, LLC, Malibu, CA (US)

(72) Inventors: Soheil Kolouri, Agoura Hills, CA (US); Heiko Hoffmann, Simi Valley, CA (US); David W. Payton, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 532 days.

(21) Appl. No.: 17/368,635

(22) Filed: Jul. 6, 2021

Related U.S. Application Data

(60) Provisional application No. 63/060,494, filed on Aug. 3, 2020.

(51) Int. Cl.
| | |
|---|---|
| *G06F 18/24* | (2023.01) |
| *G06F 18/21* | (2023.01) |
| *G06F 18/214* | (2023.01) |
| *G06F 18/232* | (2023.01) |
| *G06F 21/56* | (2013.01) |

(Continued)

(52) U.S. Cl.
CPC ............ *G06F 18/24* (2023.01); *G06F 18/214* (2023.01); *G06F 18/2163* (2023.01); *G06F 18/217* (2023.01); *G06F 18/232* (2023.01); *G06F 21/566* (2013.01); *G06N 3/08* (2013.01); *G06V 10/22* (2022.01); *G06F 2221/034* (2013.01)

(58) Field of Classification Search
CPC .... G06F 18/24; G06F 18/214; G06F 18/2163; G06F 18/217; G06F 18/232; G06F 21/566; G06F 2221/034; G06N 3/08; G06V 10/22

USPC ......................................................... 382/103
See application file for complete search history.

(56) References Cited

U.S. PATENT DOCUMENTS

| | | | |
|---|---|---|---|
| 2019/0130110 A1* | 5/2019 | Lee ......................... | G06N 3/08 |
| 2020/0234110 A1* | 7/2020 | Singh ....................... | G06N 3/08 |

(Continued)

OTHER PUBLICATIONS

Athalye, A., Engstrom, L., Ilyas, A. and Kwok, K., 2017. Synthesizing robust adversarial examples. arXiv preprint arXiv:1707.07397, pp. 1-19.

(Continued)

*Primary Examiner* — Juan A Torres
(74) *Attorney, Agent, or Firm* — TOPE-MCKAY & ASSOCIATES

(57) ABSTRACT

Described is a system for object detection that is robust to adversarial attacks. An initial hypothesis of an identity of an object in an input image is generated using a sparse convolutional neural network (CNN) and a distribution aware classifier. A foveated hypothesis verification process is performed for identifying a region of the input image that supports the initial hypothesis. Using a part-based classifier, an identity of a part of the object in the region of the input image is predicted. An attack probability for the predicted identity of the part, and the initial hypothesis is updated based on the predicted identity of the part and the attack probability. The foveated hypothesis verification process and updating of hypotheses is performed until a hypothesis reaches a certainty threshold. The object is labeled based on the hypothesis that reached the certainty threshold.

17 Claims, 14 Drawing Sheets

(51) Int. Cl.
*G06N 3/08* (2023.01)
*G06V 10/22* (2022.01)

(56) References Cited

U.S. PATENT DOCUMENTS

| | | | | |
|---|---|---|---|---|
| 2020/0410228 | A1* | 12/2020 | Wang | G06V 10/82 |
| 2021/0034737 | A1* | 2/2021 | Khan | G06F 21/554 |
| 2021/0056404 | A1* | 2/2021 | Goswami | G06F 18/22 |
| 2022/0174089 | A1* | 6/2022 | Piegert | G06V 10/82 |
| 2022/0292356 | A1* | 9/2022 | Singh | G06F 21/577 |

OTHER PUBLICATIONS

Athalye, A., Carlini, N. and Wagner, D., Jul. 2018. Obfuscated Gradients Give a False Sense of Security: Circumventing Defenses to Adversarial Examples. In International Conference on Machine Learning, pp. 274-283.

Carlini, N. and Wagner, D., May 2017. Towards evaluating the robustness of neural networks. In 2017 IEEE Symposium on Security and Privacy (SP), pp. 39-57.

Eykholt, K., Evtimov, I., Fernandes, E., Li, B., Rahmati, A., Xiao, C., Prakash, A., Kohno, T. and Song, D., 2018. Robust physical-world attacks on deep learning visual classification. In Proceedings of the IEEE Conference on Computer Vision and Pattern Recognition, pp. 1625-1634.

Kolouri, S., Martin, C.E. and Hoffmann, H., 2017. Explaining distributed neural activations via unsupervised learning. In Proceedings of the IEEE Conference on Computer Vision and Pattern Recognition Workshops, pp. 20-28.

Kolouri, S., Rohde, G.K. and Hoffmann, H., 2018. Sliced Wasserstein distance for learning Gaussian mixture models. In Proceedings of the IEEE Conference on Computer Vision and Pattern Recognition, pp. 3427-3436.

Kolouri, S., Pope, P.E., Martin, C.E. and Rohde, G.K., 2019. Sliced Wasserstein Auto-Encoders. International Conference of Representation Learning (ICLR), pp. 1-19.

Madry, A., Makelov, A., Schmidt, L., Tsipras, D. and Vladu, A., 2018. Towards Deep Learning Models Resistant to Adversarial Attacks. International Conference of Representation Learning (ICLR), pp. 1-28.

Prakash, A., Moran, N., Garber, S., DiLillo, A. and Storer, J., 2018. Deflecting adversarial attacks with pixel deflection. In Proceedings of the IEEE Conference on Computer Vision and Pattern Recognition, pp. 8571-8580.

Su, J., Vargas, D.V. and Sakurai, K., 2019. One-pixel attack for fooling deep neural networks. IEEE Transactions on Evolutionary Computation, pp. 828-841.

Houben, S., Stallkamp, J., Salmen, J., Schlipsing, M. and Igel, C., Aug. 2013. Detection of traffic signs in real-world mages: The German Traffic Sign Detection Benchmark. In The 2013 International Joint Conference on Neural Networks (IJCNN), pp. 1-8.

McInnes, L., Healy, J. and Melville, J., 2018. Umap: Uniform manifold approximation and projection for dimension reduction. arXiv preprint arXiv:1802.03426, pp. 1-63.

\* cited by examiner

Distribution aware decision boundaries reduce the chance of perturbation attacks by limiting the space of perturbations

| Deficiencies of Prior Art Machine Vision Systems | Solution provided by invention |
|---|---|
| Open ended decision boundaries: In state-of-the-art deep nets, decision boundaries are open ended leaving a lot of room for attacks and do not necessarily conform to the underlying distribution of seen data. In addition, many learned network kernels provide unhelpful information (because too many parameters to learn) and thus also provide simple backdoors for attackers. | Innovation 1: Hardened decision boundaries will reduce angles of attack and are achieved through bio-inspired neuro-modulation (e.g., sparse connections) and through learning boundaries that enclose a class distribution tightly. |
| Model complex objects: Images of complex objects, e.g., car images, have a complicated and very high-dimensional training data distribution making it difficult to find hardened decision boundaries. | Innovation 2: Unsupervised data decomposition discovers semantically meaningful components, for which decision boundaries can be hardened. Hence, a complex object is decomposed into simpler semantically meaningful components. |
| Bag of attributes representation: Current deep neural networks still use a bag-of-attribute representation of objects, meaning that the geometric relationship between different object parts is discarded. While this very nature of deep nets makes them robust to occlusions and non-rigid transformations, it makes these systems also vulnerable to attacks. | Innovation 3: Foveated hypothesis verification learns object part relationships and iteratively checks for expected parts and discovers inconsistencies. |

FIG. 14

PROCESS TO MAKE MACHINE OBJECT DETECTION ROBUST TO ADVERSARIAL ATTACKS

CROSS-REFERENCE TO RELATED APPLICATIONS

This is a Non-Provisional Application of U.S. Provisional Application No. 63/060,494, filed in the United States on Aug. 3, 2020, entitled, "Process to Make Machine Object Detection Robust to Adversarial Attacks," the entirety of which is incorporated herein by reference.

BACKGROUND OF INVENTION

(1) Field of Invention

The present invention relates to a system for performing machine vision tasks and, more particularly, to a system for performing machine vision tasks that is not vulnerable to adversarial attacks.

(2) Description of Related Art

Deep convolutional neural networks (CNNs) provide the state-of-the-art performance for machine vision tasks, such as object detection and recognition. However, deep CNNs are vulnerable to adversarial attacks. This vulnerability is rooted in the fact that these deep networks perform recognition based on a complex, but not necessarily meaningful, combination of high-level features. Consequently, small changes to just a portion of an image can bias the output to an incorrect class (e.g., 'car' image is recognized as 'ostrich'). This vulnerability is further exacerbated by the nature of deep-net decision boundaries, which have two main weaknesses. First, they are open-ended and not limited to the actual distribution of training data. Second, the kernel functions that emerge through training contain redundant kernels that can provide a backdoor for attacks.

One of the most reliable defenses against adversarial attacks in the literature is that of Madry et al. (see Literature Reference No. 8 of the List of Incorporated Literature References). These methods bias the defense toward the choice of the metric (e.g., $l_\infty$ norm). Another popular approach toward defenses against adversarial attacks is denoising-based approaches, such as Literature Reference No. 9. These methods denoise the input image, or the subsequent deep neural activations (i.e., features). These methods only work for high frequency adversarial perturbations.

Furthermore, many defenses against adversarial examples rely on so-called 'obfuscated gradients' (see Literature Reference No. 2), including gradient shattering, stochastic gradient, and exploding and vanishing gradients. It has recently been shown that a gradient approximation attack can fully bypass these defenses (see Literature Reference No. 2).

Thus, a continuing need exists for a method of defending against adversarial attacks in machine vision tasks that does not need to obfuscate gradients and is unbiased with regard to a specific metric.

SUMMARY OF INVENTION

The present invention relates to a system for performing machine vision tasks and, more particularly, to a system for performing machine vision tasks that is not vulnerable to adversarial attacks. The system comprises one or more processors and a memory having instructions such that when the instructions are executed, the one or more processors perform multiple operations. The system generates an initial hypothesis of an identity of an object in an input image using a sparse convolutional neural network (CNN) and a distribution aware classifier. A foveated hypothesis verification process is performed, wherein performing the foveated hypothesis verification process comprises identifying a region of the input image that supports the initial hypothesis. A part-based classifier predicts an identity of a part of the object in the region of the input image. An attack probability is determined for the predicted identity of the part. The initial hypothesis is updated based on the predicted identity of the part and the attack probability. The foveated hypothesis verification process and updating of hypotheses is performed until a hypothesis reaches a certainty threshold. The object is labeled based on the hypothesis that reached the certainty threshold, and an action performed by an autonomous platform is controlled based on the labeling of the object.

In another aspect, predicting the identity of a part of the object comprises: performing unsupervised part extraction to dissect the input image into a plurality of parts; generating a plurality of clusters of parts by performing unsupervised clustering of the plurality of parts; for each cluster of parts, learning an autoencoder model and storing each autoencoder model as prior knowledge; and recognizing parts of input images using the stored autoencoder models.

In another aspect, the foveated hypothesis verification process further comprises: receiving the input image, the predicted identities of parts, and a current hypothesis; using a recurrent neural network with long-short-term-memory, outputting a next region of the input image that supports the current hypothesis; and sending the next region to the part-based classifier.

In another aspect, the distribution aware classifier is based on generative models that capture a decision boundary by encoding distribution of a set of training data.

In another aspect, an attention map is obtained from the sparse CNN, the attention map is updated using the updated hypothesis, and the foveated hypothesis verification process is controlled using the updated attention map.

In another aspect, the autonomous platform is a vehicle, and the system causes the vehicle to perform a driving operation in accordance with the labeling of the object.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 14 is a table illustrating deficiencies of prior art machine vision systems and how the deficiencies are addressed according to some embodiments of the present disclosure.

DETAILED DESCRIPTION

Figure 1:
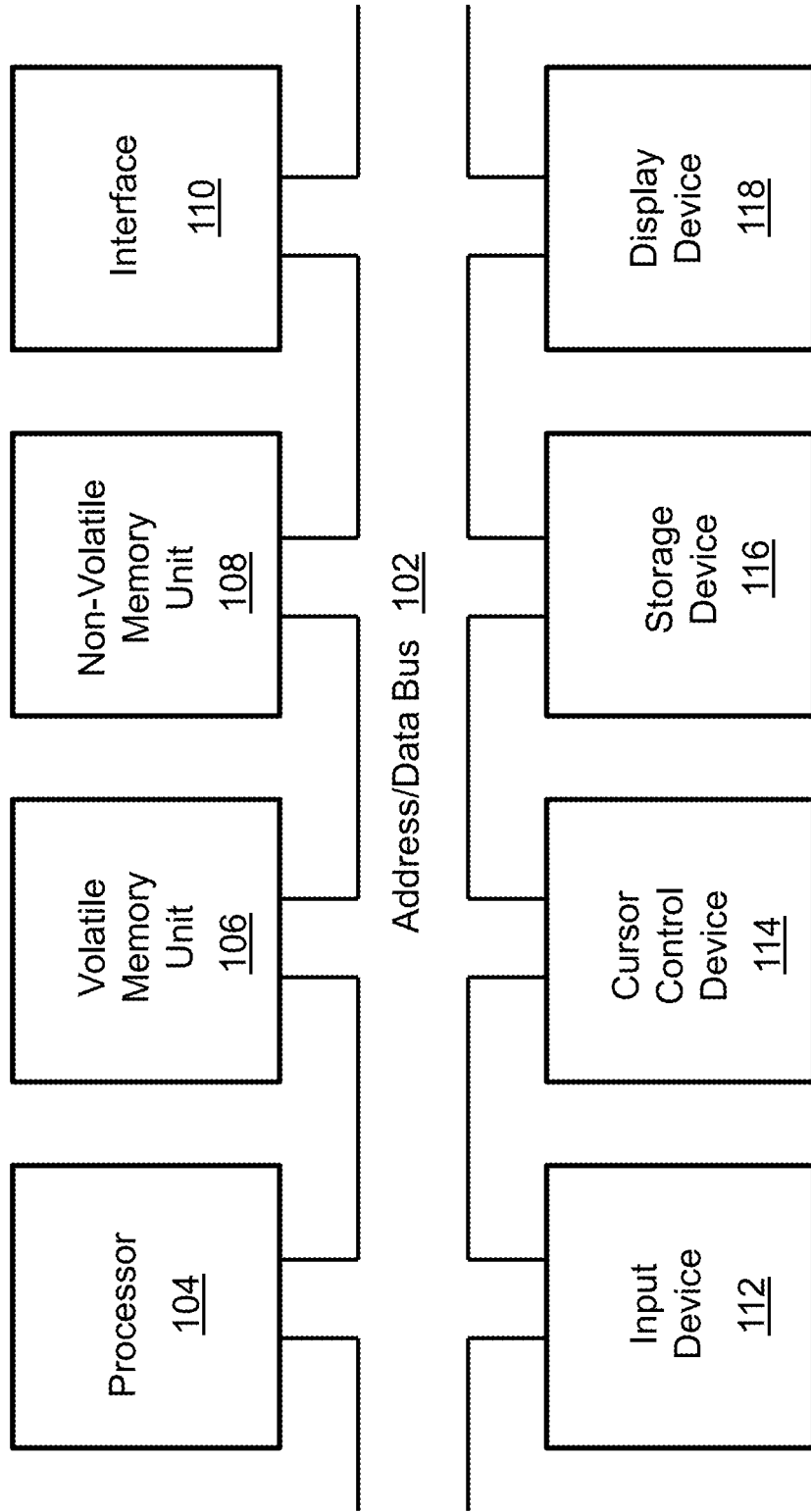
FIG. 1 is a block diagram depicting the components of a system for performing machine vision tasks according to some embodiments of the present disclosure.

The present invention relates to a system for performing machine vision tasks and, more particularly, to a system for performing machine vision tasks that is not vulnerable to adversarial attacks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Athalye, A., Engstrom, L., Ilyas, A. and Kwok, K., 2017. Synthesizing robust adversarial examples. arXiv preprint arXiv:1707.07397.
2. Athalye, A., Carlini, N. and Wagner, D., 2018, July. Obfuscated Gradients Give a False Sense of Security: Circumventing Defenses to Adversarial Examples. In International Conference on Machine Learning (pp. 274-283).
3. Carlini, N. and Wagner, D., 2017, May. Towards evaluating the robustness of neural networks. In 2017 IEEE Symposium on Security and Privacy (SP) (pp. 39-57).
4. Eykholt, K., Evtimov, I., Fernandes, E., Li, B., Rahmati, A., Xiao, C., Prakash, A., Kohno, T. and Song, D., 2018. Robust physical-world attacks on deep learning visual classification. In Proceedings of the IEEE Conference on Computer Vision and Pattern Recognition (pp. 1625-1634).
5. Kolouri, S., Martin, C. E. and Hoffmann, H., 2017. Explaining distributed neural activations via unsupervised learning. In Proceedings of the IEEE Conference on Computer Vision and Pattern Recognition Workshops (pp. 20-28).
6. Kolouri, S., Rohde, G. K. and Hoffmann, H., 2018. Sliced Wasserstein distance for learning Gaussian mixture models. In Proceedings of the IEEE Conference on Computer Vision and Pattern Recognition (pp. 3427-3436).
7. Kolouri, S., Pope, P. E., Martin, C. E. and Rohde, G. K., 2019. Sliced Wasserstein Auto-Encoders. International Conference of Representation Learning (ICLR).

8. Madry, A., Makelov, A., Schmidt, L., Tsipras, D. and Vladu, A., 2018. Towards Deep Learning Models Resistant to Adversarial Attacks. International Conference of Representation Learning (ICLR).
9. Prakash, A., Moran, N., Garber, S., DiLillo, A. and Storer, J., 2018. Deflecting adversarial attacks with pixel deflection. In Proceedings of the IEEE Conference on Computer Vision and Pattern Recognition (pp. 8571-8580).
10. Su, J., Vargas, D. V. and Sakurai, K., 2019. One-pixel attack for fooling deep neural networks. IEEE Transactions on Evolutionary Computation.
11. Houben, S., Stallkamp, J., Sairnen, J., Schlipsing, M. and Igel, C., 2013, August. Detection of traffic signs in real-world images: The German Traffic Sign Detection Benchmark. In The 2013 International Joint Conference on Neural Networks (IJCNN) (pp. 1-8).
12. McInnes, L., Healy, J. and Melville, J., 2018. Umap: Uniform manifold approximation and projection for dimension reduction. arXiv preprint arXiv: 1802.03426.

(2) Principal Aspects

Various embodiments of the invention include three "principal" aspects. The first is a system for performing machine vision tasks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
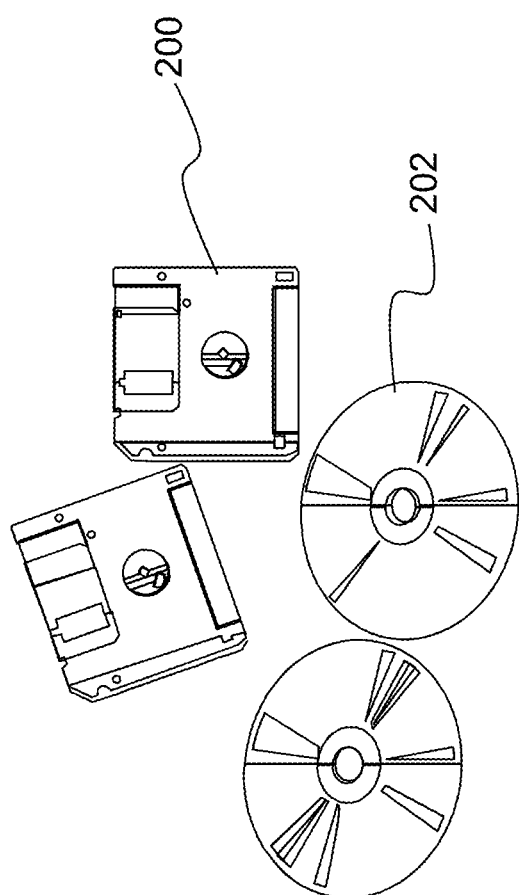
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Described is a system and method that is robust against adversarial attacks on machine learning systems. The invention described herein is inspired by human-perception and it automatically learns semantic concepts (i.e., learning the composition and relationships of scene and object components) to create a combinatoric barrier and improve recognition performance over state-of-the-art (SOA) machine vision systems for benign data. Here, the component-based detection is enabled through unsupervised component extraction, hypothesis verification, and tightening of decision boundaries.

Figure 3:
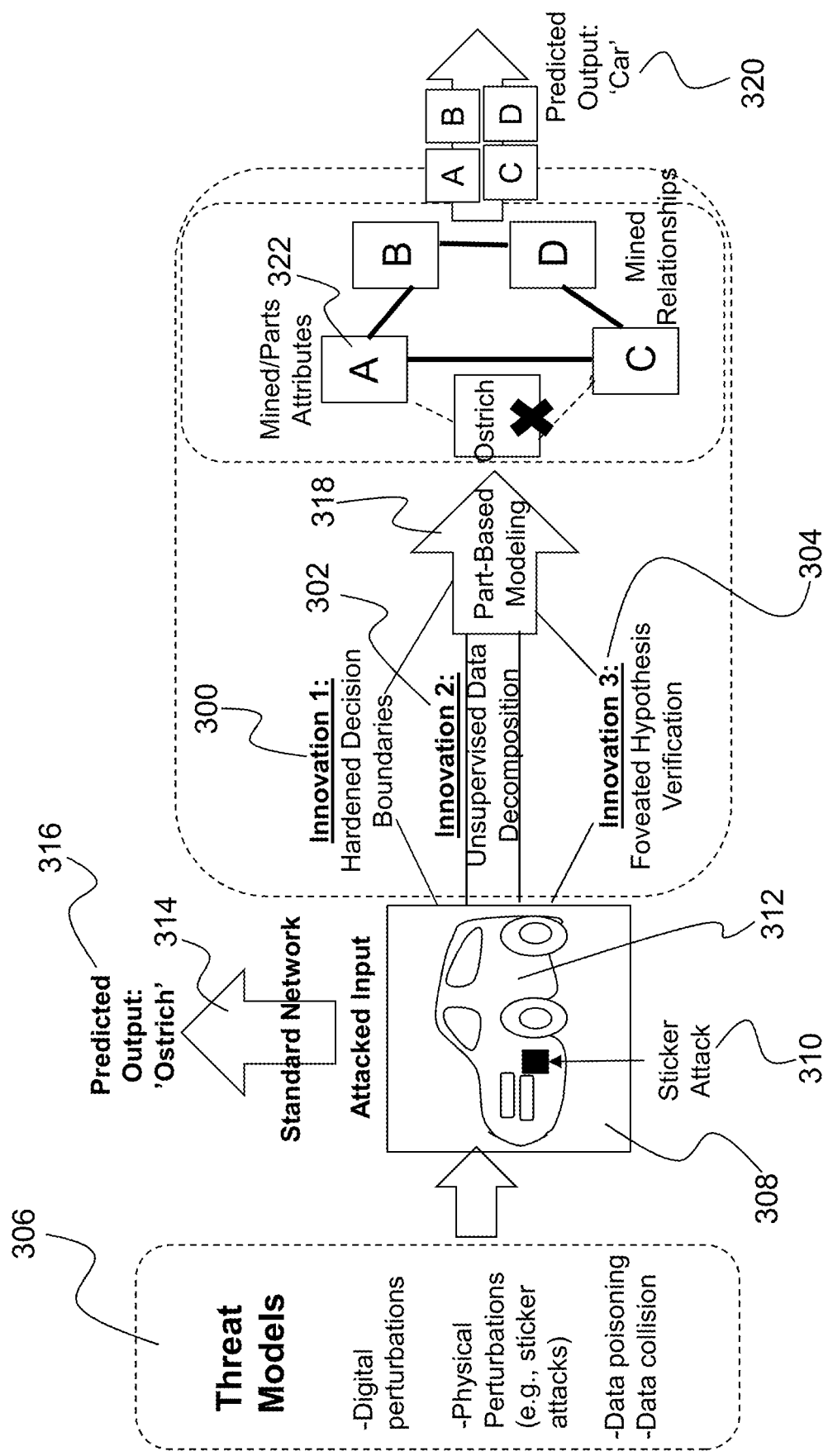
FIG. 3 is an illustration of a process for thwarting adversarial attacks by using human-inspired hypothesis verification through part-based modeling according to some embodiments of the present disclosure.

The method according to embodiments of the present disclosure is applicable to image, video, and three-dimensional (3D) data (e.g., LIDAR). FIG. 3 shows a high-level concept of the invention, showing the thwarting of adversarial attacks by human-inspired hypothesis verification through part-based modeling, which is enabled through unsupervised mining of parts and hardened decision boundaries of part models. As shown, the present invention is based on three key bio-inspired innovations. The first innovation (element 300) is hardening the neural network against attacks by improved decision boundaries, which are achieved by creating decision boundaries that conform to the distribution of training data, and by introducing sparsity of kernels in the convolutional layers of deep networks. The second innovation (element 302) is mining of parts (e.g., wheels on a car) and attributes (e.g., wheels are round and connect the car to the road) in an unsupervised way from training data. The third innovation (element 304) is using foveated hypothesis testing based on the composition of identified objects, scenes, and actions. For instance, a car is composed of various key components such as wheels, cabin, etc., with corresponding attributes, such as "wheels are round". The foveation focuses on each component while tracking its composition. FIG. 3 depicts threat models (element 306) used to attack an input image (element 308). Non-limiting examples of threat models (element 306) include digital perturbations (i.e., manipulation of digital input), physical perturbations (e.g., sticker attacks which entails putting a physical sticker on an object), data poisoning, and data collision. Data poisoning is an adversarial attack that attempts to manipulate a training dataset in order to control behavior of a trained model such that the model will label malicious examples as a desired class (e.g., labeling spam e-mails as safe). Data collision is a type of poisoning attack on neural networks in which the attacker adds manipulated data (i.e., poisoned data) to the victims training data such that when the victim trains her/his model on the poisoned data, the model's performance (e.g., accuracy) drops significantly on the test data. In the example illustrated in FIG. 3, the attack is a sticker attack (element 310), where a sticker is placed on the object (e.g., car (element 312)). Given processing of the input image (element 308) by a standard neural network (element 314), the predicted output (element 316) is incorrect, and the input image (element 308) of the car (element 312) is misclassified as 'ostrich'.

The key technical innovations are motivated by bridging the gap between human and machine perception to overcome adversarial attacks. A central theme of the method described herein is to perform human-like part-based modeling (element 318) of objects to create a combinatoric barrier that forces an attacker to alter multiple aspects of a scene in a consistent way before their attack can be successful. In support of this theme, the three innovations of unsupervised data decomposition (element 302), hardened decision boundaries (element 300), and foveated hypothesis verification (element 304) all play a crucial role in correctly classifying the input image (element 308), such that predicted output (element 320) is 'car'.

Figure 4:
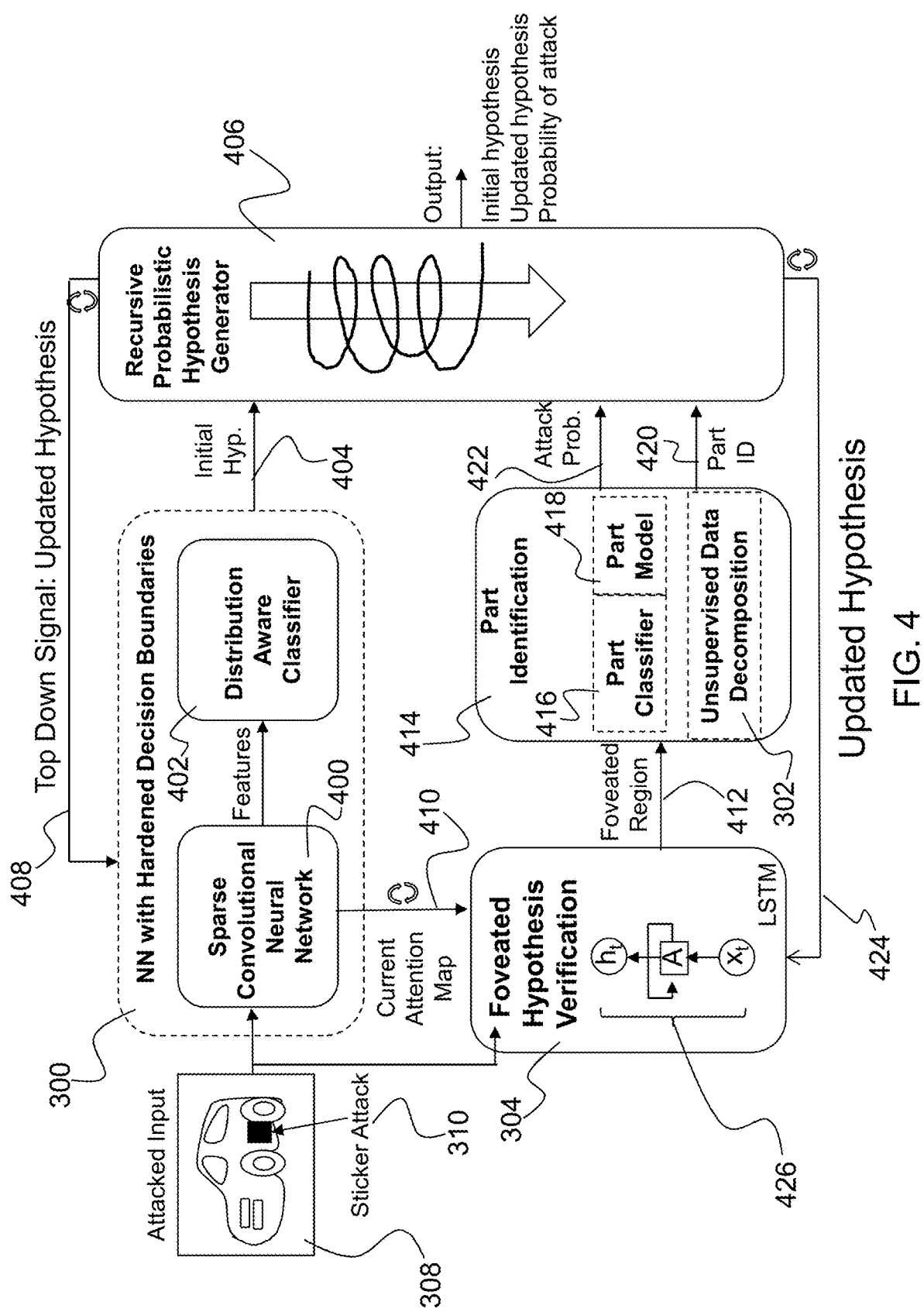
FIG. 4 is an illustration of integration of unsupervised data decomposition, foveated hypothesis verification, and hardened decision boundaries to deliver accurate recognition under attack according to embodiments of the present disclosure.

FIG. 4 depicts a functional level representation of the system described herein. As shown, the input image (element 308) first passes through a sparse convolutional neural network (CNN) (element 400) with sparse neural activations and a distribution-aware classifier (element 402) to generate an initial hypothesis (element 404). The initial hypothesis (element 404) is passed to a recursive probabilistic hypothesis generator (element 406). The initial hypothesis is then used as a top-down modulatory signal (element 408) to the neural network (element 400) to obtain a current attention map (element 410) that is passed to the foveated hypothesis verification (element 304) module alongside the hypothesis (element 404) and the input image (element 308).

Foveated hypothesis verification (element 304) then provides a local region (i.e., a foveated region (element 412)) of the input image (element 308) that is most likely to support the generated hypothesis. The local region is determined through a top-down attention that provides a Gaussian-like mask that can be multiplied with the input image to obtain only a local visible region of the input image. The local foveated region (element 412) is passed to a part identification (element 414) module, which was pre-learned based on unsupervised mined parts and attributes. The part identification (element 414) module consists of a part classifier (element 416) and a part model (element 418) to obtain an ID (element 420) for the part and measure the certainty of the predicted ID (i.e., attack probability (element 422)) via fitting a multi-variate Gaussian distribution to each cluster (components with the same part ID) and calculating the likelihood of the input component with respect to this multivariate Gaussian. The ID (element 420) is a numerical value (e.g., part 1, part 2). The part IDs are cluster assignments. The attack probability is one of the outputs of the part identification (element 414), which is a scaler between 0-1 that identifies whether the image part is attacked or not. The attack probability emerges as the process of learning part-classifier and part-model.

The predicted part ID (element 420) and its corresponding attack probability (element 422) are fed back to the recursive hypothesis generator (element 406) to update the initial hypothesis (element 404). The updated hypothesis (element 424) is then used as a top-down signal (element 408) to update the attention map (element 410), which is then used to control foveation (element 304). This process is repeated until the updated hypothesis (element 424) reaches a certainty threshold (i.e., reaches a confident decision). The certainty threshold is an application-dependent hyper-parameter of the approach described herein. For critical applications, a higher certainty threshold is required.

In summary, the present invention devises an unsupervised attribution of input parts (e.g., spatial-temporal attributes) and uses it together with dynamic foveation to reach a consistent hypothesis about the input sensory data. The neural-network machinery used in the system differs from the standard CNNs in that a brain-inspired sparsification of neural activations and a distribution aware classifier that provides a baseline protection against perturbation attacks are used. Each of these aspects will be described in further detail below.

(3.1) Protection Against Adversarial Attacks

The protection against physical and digital world attacks using the system according to embodiments of the present disclosure emerges from the interplay between unsupervised data decomposition (element 302) for part-based modeling (element 318), foveated hypothesis verification (element 304) with a top-down attention mechanism (elements 408 and 410), and a core neural network (element 400) with hardened decision boundaries (element 300). For unsupervised data decomposition (element 302), parts/attributes (e.g., element 322) are learned from input sensory data (e.g., input image (element 308) in an unsupervised manner, and an implicit model for object part decomposition is built. The foveated hypothesis verification (element 304) uses a recurrent neural network (element 426) with long-short-term-memory (LSTM) to sequentially inspect the sensory input to confirm or change a hypothesis. Below, each key element of the system is described.

(3.1.1) Hardened Decision Boundaries (Element 300)

Digital inference attacks are often in the form of small additive perturbations to the sensory input. These attacks are quite counter-intuitive to humans, as they are designed to be invisible to the human eye. Such attacks are possible because the trained neural networks often learn redundant and correlated kernels that leave abundant room for the adversary to attack the system. For a fixed sensory input, there are many active neurons (i.e., neurons with non-zero neural activations) in each layer of the neural network. This enables the attacker to attach a small perturbation to each active neuron that accumulates to a large distortion for the down-stream neurons.

Figure 5:
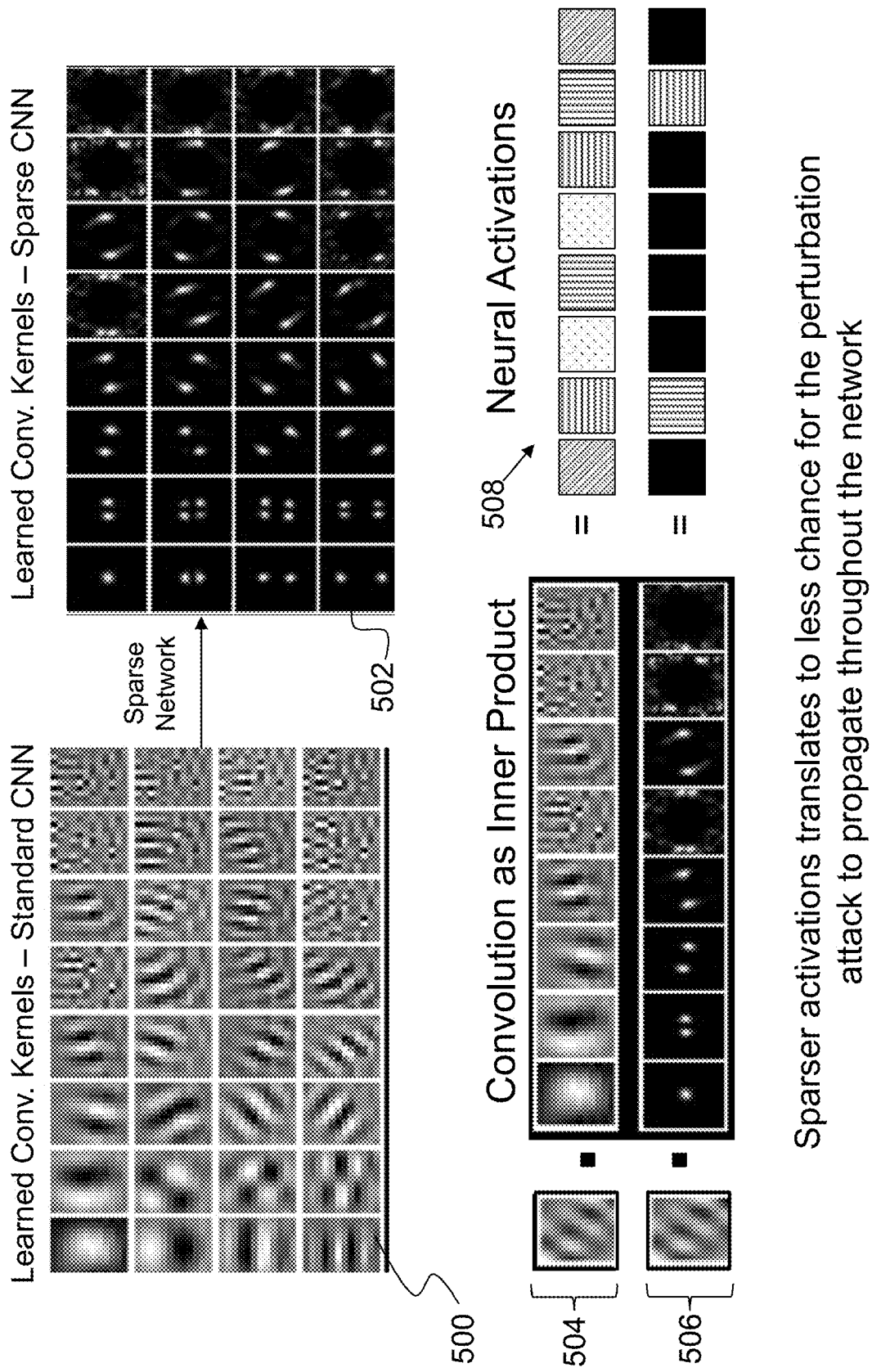
FIG. 5 is an illustration of use of sparsity as a barrier against small perturbation attacks by reducing network redundancy according to some embodiments of the present disclosure.

FIG. 5 depicts the unique use of sparsity which acts as a barrier against small perturbation attacks by reducing the redundancy in the network. Sparsity forces an attacker to use larger perturbations without reducing network accuracy on normal images. Sparser activations translates to less chance for the perturbation attack to propagate throughout the network. Small perturbation attacks are defended against by sparsifying the neural activations in the network (i.e., having only a few neurons with non-zero activations). To achieve sparsification from a standard CNN (element 500) to a sparse CNN (element 502), two processes are utilized: 1) regularizing the neurons to perform in their saturated state, by penalizing deviation from saturation (e.g., 0 and 1) for each neuron during training, and 2) regularizing a weighted $L_1$-norm of layerwise neural activations. The bottom of FIG. 5 depicts two rows, where the top row (element 504) shows the learned convolutional kernels in a standard convolutional neural network (CNN), while the bottom row (element 506) shows the learned convolutional kernels in a sparse CNN. The output of convolving the input patch with the convolutional kernels for both methods (i.e., convolution as inner product) are neural activations (element 508), where the standard CNN has many active neurons while the sparse CNN has only a few neurons active.

Figures 6A, 6B:
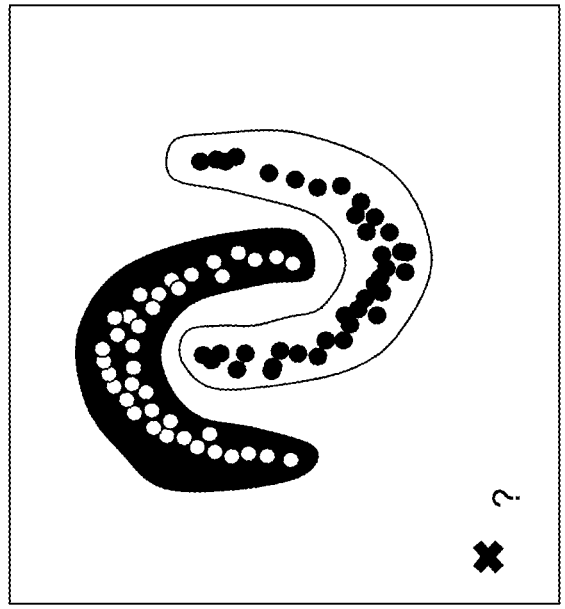
FIG. 6A is an illustration of standard decision boundaries according to some embodiments of the present disclosure.
FIG. 6B is an illustration of distribution aware decision boundaries according to some embodiments of the present disclosure.

Sparsifying the neural activations forces the attacker to use larger perturbations to achieve a successful attack, but does not prevent the attack completely. FIGS. 6A and 6B illustrate standard decision boundaries and distribution aware boundaries of the present invention, respectively. The distribution aware classifier effectively prevents large perturbation attacks (i.e., outlier attacks). To fortify against large perturbation attacks, a distribution-aware decision boundary is utilized (FIG. 6B). Standard classifiers used in today's neural networks (e.g., softmax classifiers) provide an open-ended decision boundary (FIG. 6A) that leaves abundant room for the attacker to design a large perturbation attack that could still be subtle (e.g., one-pixel attacks (see Literature Reference No. 10)). These large perturbation attacks leverage the fact that decision boundaries in neural networks have no mechanism to detect outliers and could classify a point far away from any training data they have seen with high confidence. To overcome this shortcoming, a distribution aware classifier based on generative models (e.g., Sliced Wasserstein Autoencoder (see Literature Reference No. 7)) is devised that keeps track of the distribution of the training data, enabling the network to detect outliers and provide a realistic certainty for the output decision. Generative models, such as Sliced Wasserstein Auto-Encoders, capture the decision boundary more accurately by encoding the distribution of the training data.

(3.1.2) Unsupervised Part Decomposition (Element 302)

Figure 7:
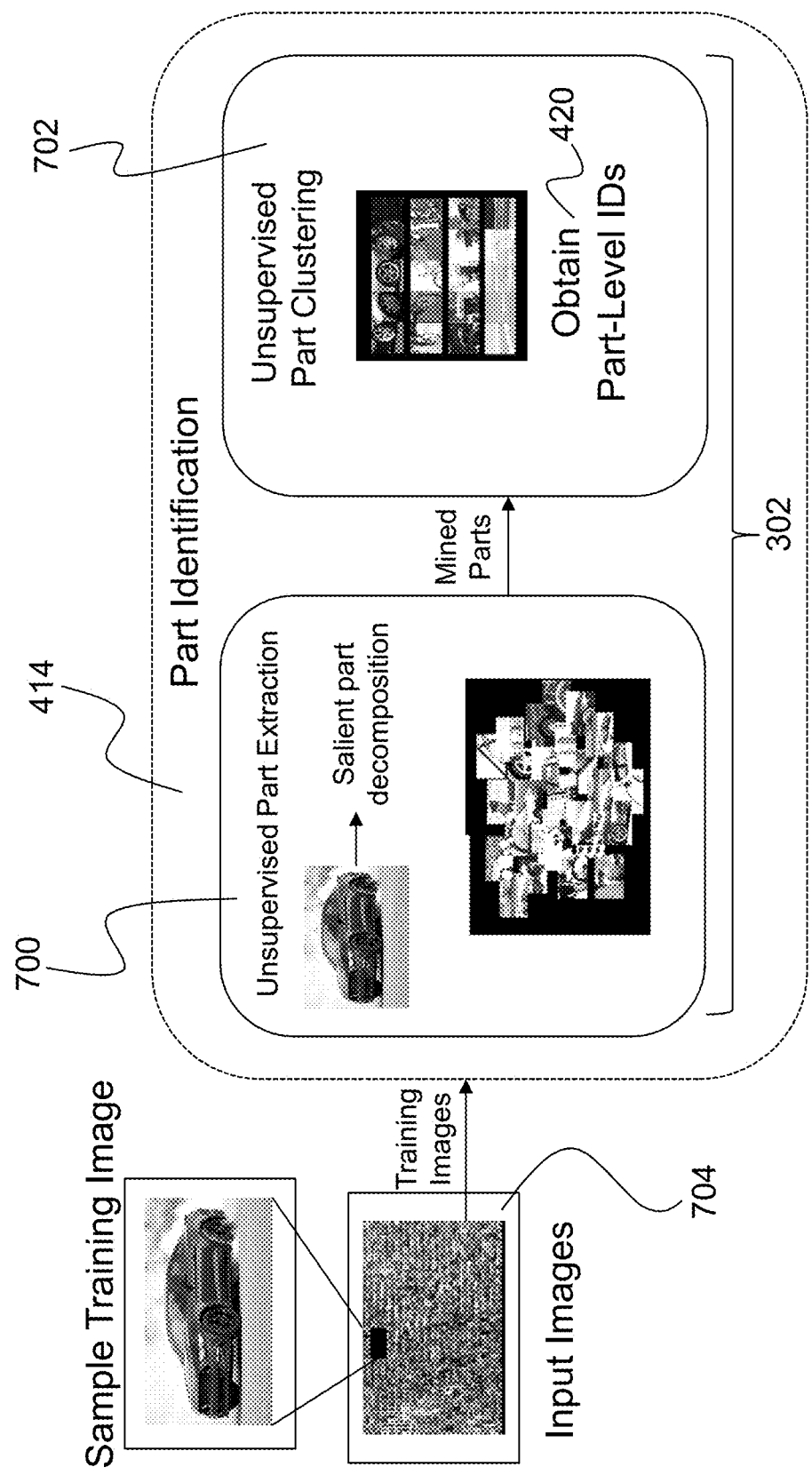
FIG. 7 is an illustration of unsupervised part identification according to some embodiments of the present disclosure.

Unsupervised part decomposition (element 302) is at the heart of the system described herein, which enables the system to build a part-based model (element 418) for the sensory input data and verify the initial hypothesis (element 404) by existence of parts and their relation(s). The main challenge with part-based hypothesis verification is that part-based labeling of sensory input data is extremely expensive, and therefore, supervised learning of part decomposition is out of the question for large datasets. To achieve the goal in the present invention, input data is dissected based on its neural activation patterns with respect to the trained neural network with hardened decision boundaries on clean (i.e., un-attacked) training data. In Literature Reference No. 5, it was shown that the Nonnegative Matrix Factorization (NMF) of the final convolutional layer of a pre-trained CNN leads to blob-like masks that identify the semantically meaningful parts of the sensory input. In the present system, this technique is leveraged to dissect the input data, by calculating the non-negative matrix factorization of the intermediate features of a neural network. FIG. 7 depicts unsupervised part identification, which includes unsupervised part extraction (element 700) and unsupervised part clustering (element 702). The part identification (element 414) module learns to decompose input images (element 704) into their semantic parts/attributes and assigns an ID (element 420) to each part in a fully unsupervised manner so that no additional human intervention is required. In this context, "semantic" refers to visually identifiable parts of an object. For instance, in a car, headlights, wheels, and doors are the visually identifiable parts.

Why would the part-based modeling (element 318) help with defense against adversarial attacks? The answer is two-fold: 1) while each part can be attacked separately, achieving a consistent targeted attack on all parts is more challenging; and 2) hardening the probabilistic boundary for parts is easier than hardening it for the entire image, making it challenging to attack part models. The rationale here is that the sub-manifold for part variations has a much simpler structure compared to the manifold of variations for general sensory input. "Hardening" refers to the transition from FIG. 6A to FIG. 6B. In a classic neural network, the decision boundaries are open-ended, which exposes the network to adversarial attacks. In contrast, a hardened decision boundary follows the training distribution (FIG. 6B) and doesn't allow room for an adversarial attack.

Figure 8:
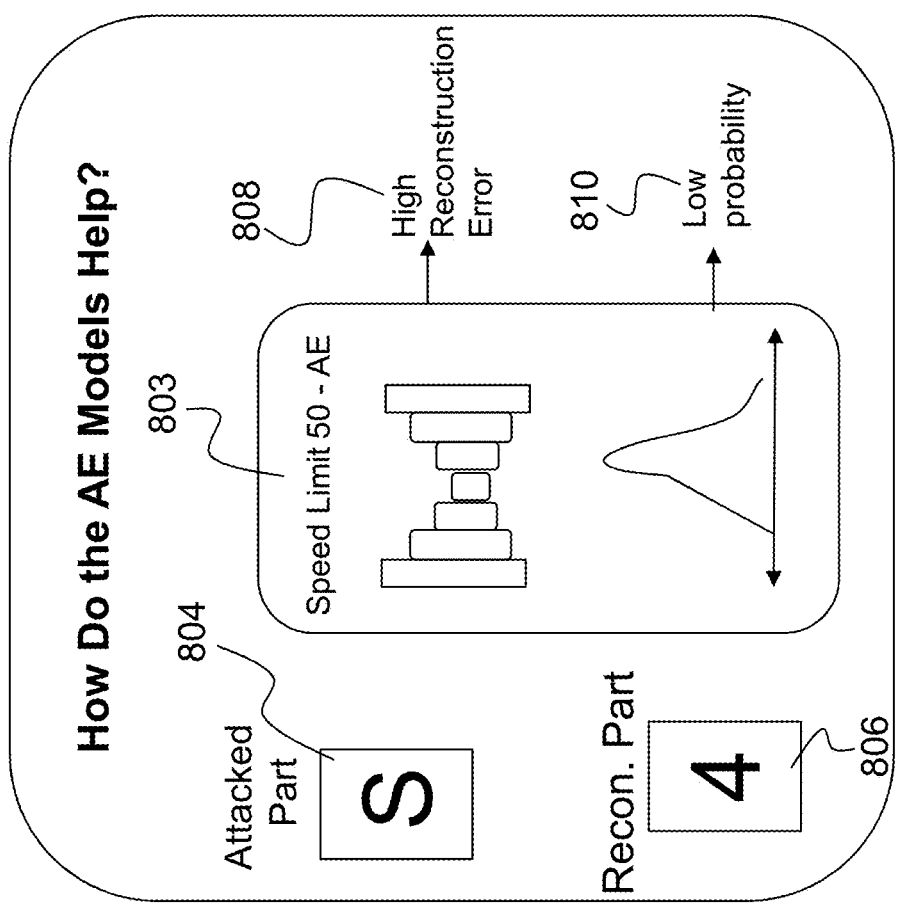
FIG. 8 is an illustration of specialized part autoencoder (AE) models trained to recognize classes of parts identified in images according to some embodiments of the present disclosure.
Figure 8:
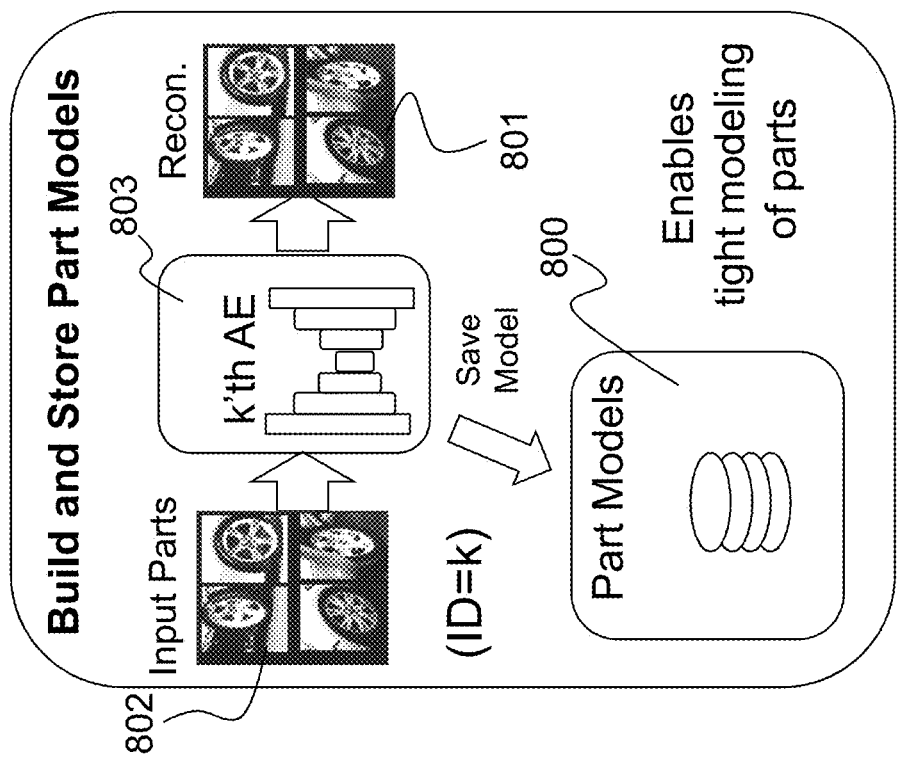

FIG. 8 illustrates specialized part autoencoder (AE) models (element 800) trained to recognize classes of parts identified in images. These models (element 800) are stored and used to recognize parts of new images presented to the system. By using the AE reconstruction error (element 801) as a measure of match, localized attacks on individual parts is overcome. The AE reconstruction error (element 801) is the output of the auto-encoder (element 803), which is required to be a reconstruction of the input parts (element 802). In general, an auto-encoder (element 803) squeezes the information in the input data/image through a bottleneck and enforces the bottleneck to contain as much information about the input as possible. This maximal preservation of information is enforced by requiring the reconstructed data/image from the bottleneck information (i.e., the decoded feature) be as close to the input as possible. The reconstruction error (element 801) is obtained by comparing the reconstructed data/images to the inputs.

The extremely high-dimensional nature of the input space for images, videos, and 3D data makes approximating the true data distribution infeasible because too many training samples would be required. However, parts have a much lower complexity. For each cluster of parts (element 802), a simple model (element 800) (e.g., a variational or Sliced-Wasserstein autoencoder) is learned, and the model (element 800) is saved as prior knowledge for each part cluster (element 802). During testing and for an attacked part (element 804), even when the part identifier misidentifies the part (e.g., the letter "S" in a stop sign is identified as a "4" (element 806)), the prior model would report a high reconstruction error (element 808), indicating a low probability (element 810) of the attacked part (element 806) belonging to the identified class. The mechanism is related to the idea of the distribution aware classifier in FIGS. 6A and 6B. The reconstruction error is determined by calculating the Mean Squared Error (MSE) of the reconstructed part, which includes subtracting the output of the auto-encoder from the input, squaring it, and calculating the sum of the squared errors.

(3.1.3) Foveated Hypothesis Verification (Element 304)

To test if a combination of identified parts is consistent, foveated hypothesis verification (element 304) is used. This strategy also allows the approach to naturally extend from object classification to object detection because parts are localized within an image. The common element of physical world patch attacks is that the attacker modifies a small part of the field-of-view (often with large perturbations), causing the classifier to misclassify the entire object or scene. These attacks work in the physical world and can be made robust to pose, viewpoint, and lighting variations (see Literature Reference Nos. 1 and 4). While often local, the attack can seep throughout the neural activations and poison a large portion of down-stream neurons, causing the neural network to become hypnotized by the patch and only focus on the patch region. This locality motivates the idea that local processing is required to enforce the network to snap itself out of such hypnosis in real-world attacks.

To that end, a unique method was devised, referred to as foveated hypothesis verification (element 304), which is a recurrent active attention mechanism that resembles the foveation and saccadic eye movement in human vision. The foveated hypothesis verification (element 304) mechanism, depicted in FIG. 9, checks if an input (element 308) is consistent with a part-based model. The foveated hypothesis verification (element 304) uses a recurrent model that is capable of extracting information from input sensory data in a local and sequential manner to update its hypothesis about the input (element 308). It receives the sensory input (element 308), an attention map (element 410), the object IDs from previous foveated regions, and the current hypothesis. The foveated hypothesis verification (element 304) then outputs the next foveated region (element 412) that could provide evidence for the current hypothesis and sends the foveated region (element 412) to the part-based classifier (element 416). This verification process is not limited to parts within an object but also extends to parts that are expected in the context of an object (e.g., parts of an intersection near a stop sign).

Figure 9:
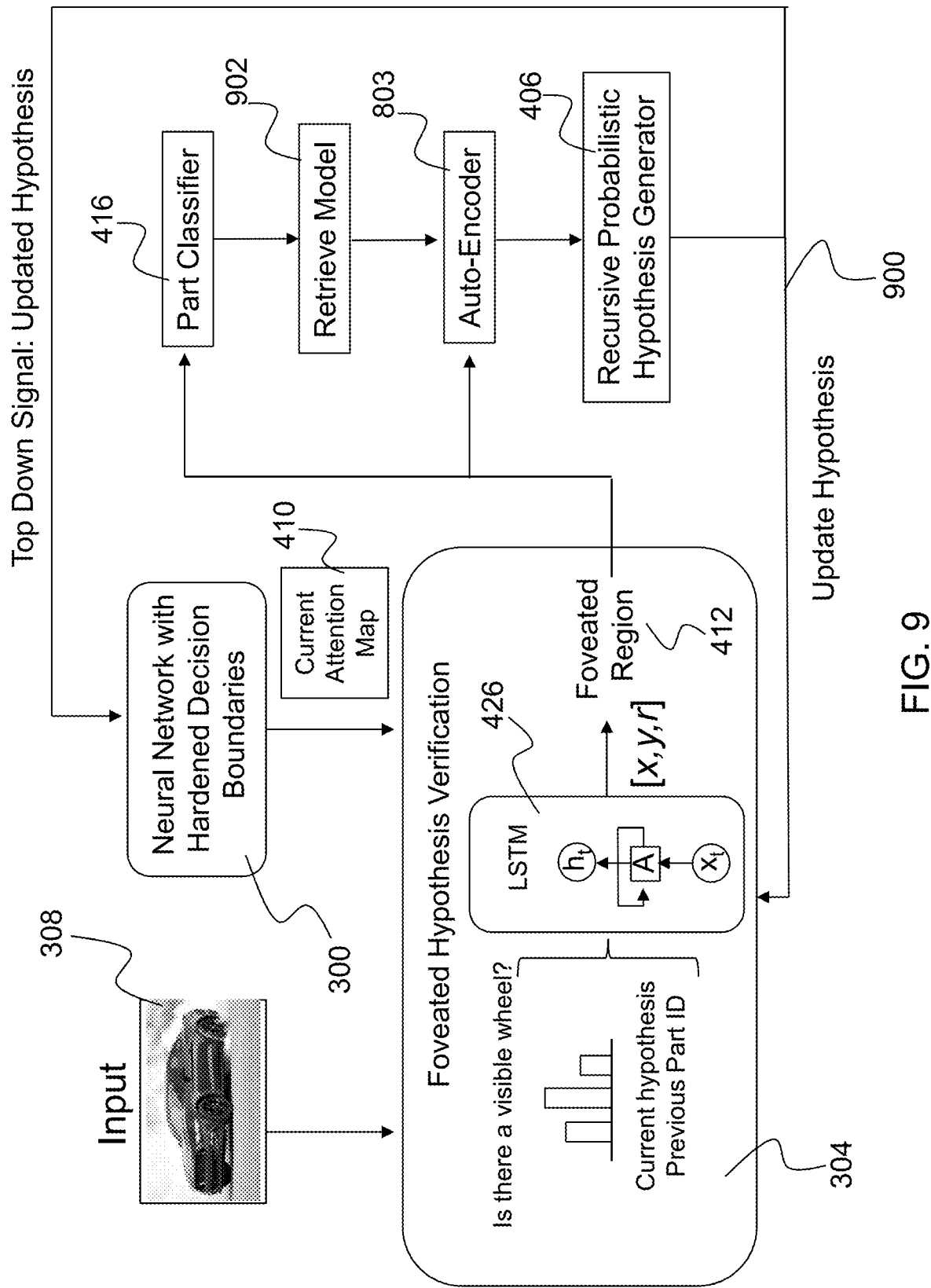
FIG. 9 is an illustration of the foveated hypothesis verification mechanism that checks if the input is consistent with a part-based model according to some embodiments of the present disclosure.

In unsupervised part clustering (element 702 in FIG. 7), an ID is assigned to each part (i.e., part-level IDs (element 420)). Then, for each part ID, an auto-encoder (element 803) is learned which serves as a means to identify the distribution of the part. As shown in FIG. 9, given that there are multiple auto-encoders (element 803) (one per part ID) for an input part, first the part's ID needs to be identified, which is performed by the part classifier (element 416 in FIG. 4). Then, the correct auto-encoder (element 803) corresponding to the identified part ID needs to be retrieved (i.e., retrieve model (element 902 in FIG. 9)). The retrieved auto-encoder (element 803) then receives the input part (element 802) and outputs the reconstruction error (element 801 in FIG. 8), which is then fed to the Recursive Probabilistic Hypothesis Generator (element 406 in FIG. 9).

How does the foveated hypothesis verification (element 304) achieve the task of proposing regions that provide evidence for the hypothesis? The foveated hypothesis verification (element 304) is trained in a reinforcement learning setting. The network receives a large numerical reward when it achieves the correct hypothesis with high certainty and with as little foveation steps as possible to enforce learning only the most influential parts of the sensory input. In this manner, the network implicitly learns the part relationships for optimal foveation. Once foveated parts (i.e., foveated regions (element 412) are identified, the system described herein updates its hypothesis (element 900) about the perceived object.

Figure 10:
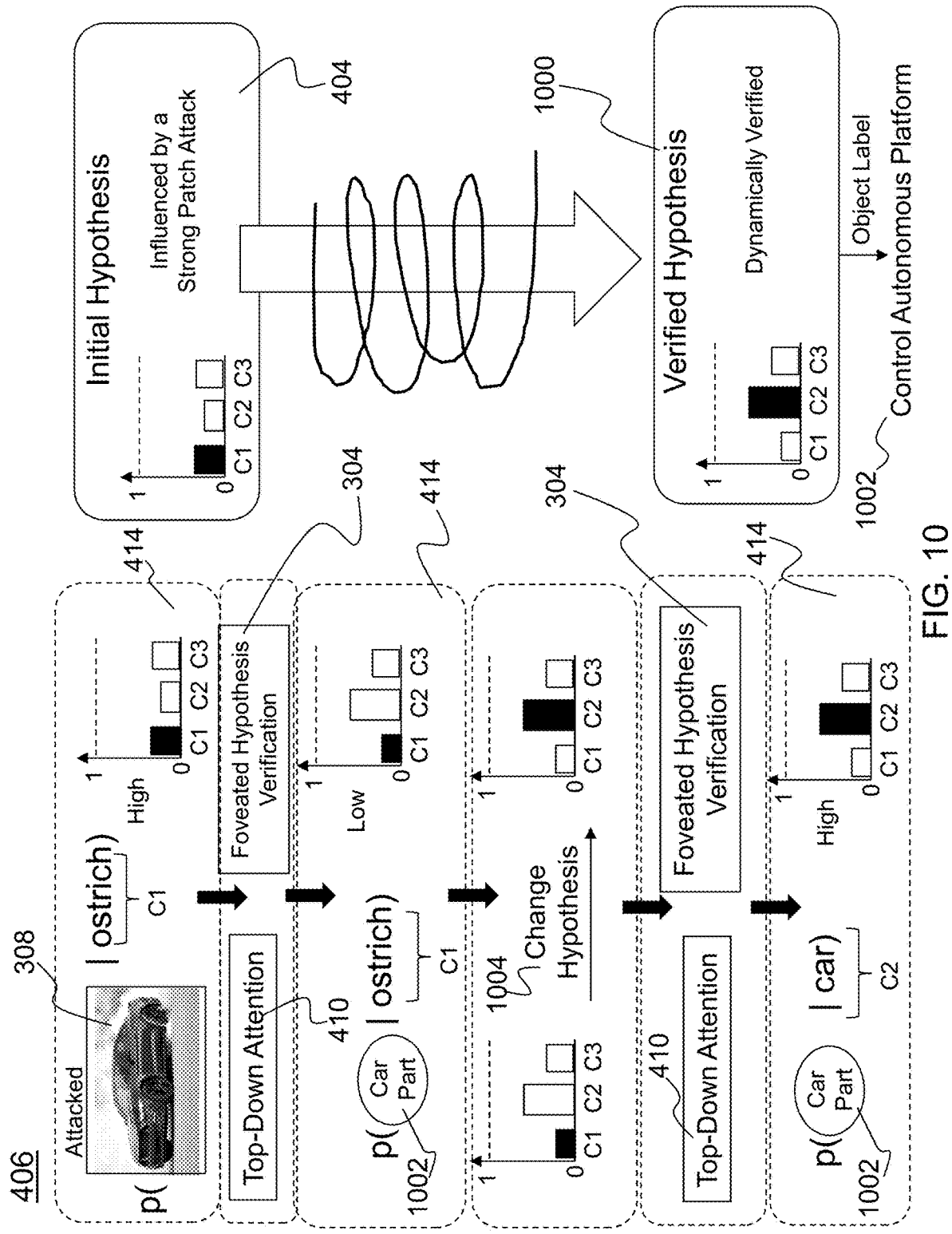
FIG. 10 is an illustration of objects robustly identified from their parts using a recursive probabilistic hypothesis generator that reevaluates an initial hypothesis iteratively using parts found by the foveated hypothesis verification and part identifier according to some embodiments of the present disclosure.

FIG. 10 depicts how objects are robustly identified from their parts using a recursive probabilistic hypothesis generator (element 406) that reevaluates an initial hypothesis (element 404) iteratively using parts found by the foveated hypothesis verification (element 304) and part identification (element 414). The likelihood for sensory input (element 308) belonging to a certain class is estimated. The foveated hypothesis verification (element 304), together with the part identification (element 414), provides local information about parts/attributes of the sensory input (element 308). The initial hypothesis (element 404) about the input (element 308) is recursively updated using the part information until a verified hypothesis (element 1000) is obtained.

Let x be the sensory input (element 308) and let c k identify the k'th class of interest (note that the method is readily extendable to regression tasks and is not specific to classification). Referring to FIG. 10, the classes of interest are "ostrich" (C1) and "car" (C2). Let $Z_i$ represent the i'th part/attribute of x. In FIG. 10, "car part" (element 1002) refers to a part/attribute of an image of a car. The likelihood for x belonging to class k is written as $p(x|c_k)$ (e.g., p("car part"|"ostrich"). The softmax classifier in a standard neural network approximates this likelihood. The input then is classified via argma $_k p(x|c_k)$. When observing a sequence of parts $z_1, \ldots, z_M$ that construct the sensory input x, evaluate if $p(x|c_k)$ agrees with $p(z_1, \ldots, z_M|c_k)$. Furthermore, take into account the statistical dependencies between parts. For instance, observing the 'trunk' of a car would reduce the probability $p(z_2=\text{Headlights}|c_k=\text{Car}, z_1=\text{Trunk})$ and increase the probability for $p(z_2=\text{talelights}|c_k=\text{Car}, z_1=\text{Trunk})$. This leads to a natural interdependence of parts:
$dp(x|c_k) \approx p(z_1, \ldots, z_M|c_k) = p(z_1|c_k)p(z_2|c_k, z_1) \ldots p(z_M|c_k, \ldots, z_{M-1})$, where the hypothesis is updated (i.e., change hypothesis (element 1004)) with each received component. As a result, the system according to embodiments of the present disclosure reevaluates the initial hypothesis (element 404) by a probabilistic model of parts to defend against adversarial attacks.

(3.1.4) Test of Elements of the Invention

Figure 11:
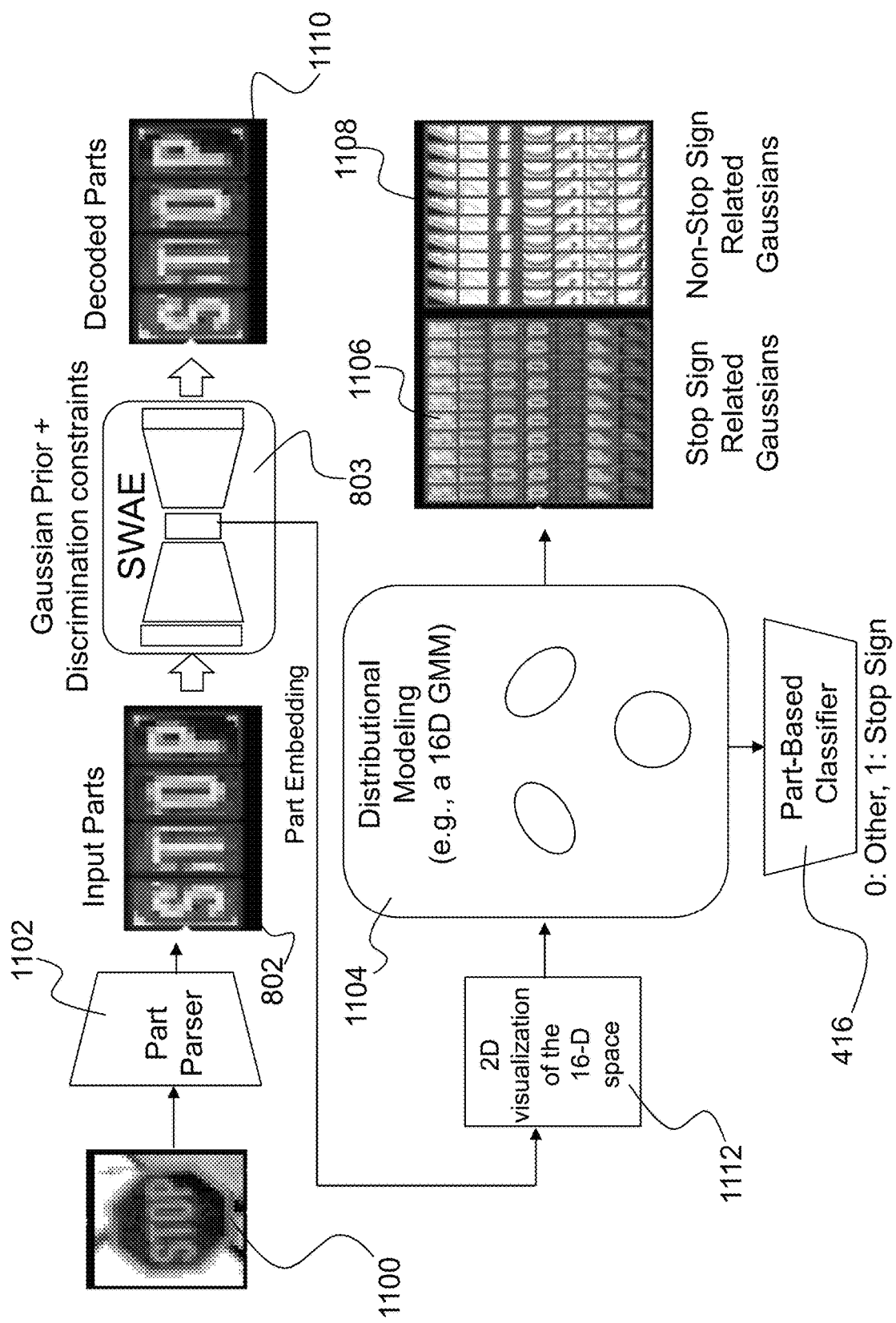
FIG. 11 is an illustration of the combination of unsupervised part modeling and hardened boundaries with autoencoders for improved attack resilience according to some embodiments of the present disclosure.

Two key elements of the invention described herein were tested to determine if the combination of unsupervised part modeling and hardened decision boundaries with autoencoders dramatically improve resilience to attacks. The German Traffic Sign Recognition Benchmark dataset (see Literature Reference No. 11) was used, and the goal was to detect stop signs. As illustrated in FIG. 11, an input image (element 1100) of a stop sign was first parsed, using a part parser (element 1102), into input parts (element 802), for which a Sliced-Wasserstein Autoencoder (SWAE) (element 803) was learned. In the latent space of the SWAE (element 803), a Gaussian Mixture Model (GMM) (element 1104) was learned and a part-based probabilistic classifier (element 416) was defined.

A standard CNN was trained for this binary classification task as the baseline model, which was able to achieve a 99.8% accuracy. For a hardened system, first the input images (element 1100) were automatically parsed into their parts (element 802) and the SWAE (element 803) (see Literature Reference No. 7) was trained with a Gaussian prior and with a 16-dimensional latent space (element 1104). The SWAE (element 803) was learned by constraining its latent space to be class discriminative (i.e., stop-sign vs other). After learning the discriminative SWAE (element 803), a GMM (element 1104) (see Literature Reference No. 6) in the latent space was learned. Distributional modeling with the GMM (element 1104) resulted in stop sign related Gaussians (element 1106) and non-stop sign related Gaussians (element 1108), and a probabilistic classifier (element 416) was defined for the image class. The decoded parts (element 1110) are the reconstructions of the input parts (element 802), which is equivalent to the AE reconstruction error (element 801) of FIG. 8. Given that a 16-D space cannot be visualized, a dimensionality reduction approach was used to reduce dimensionality from 16-D to 2-D and plot the data (i.e., 2D visualization of the 16-D space (element 1112)). The approach used was Umap (see Literature Reference No. 12), but other dimensionality reduction approaches could be utilized.

Figure 12:
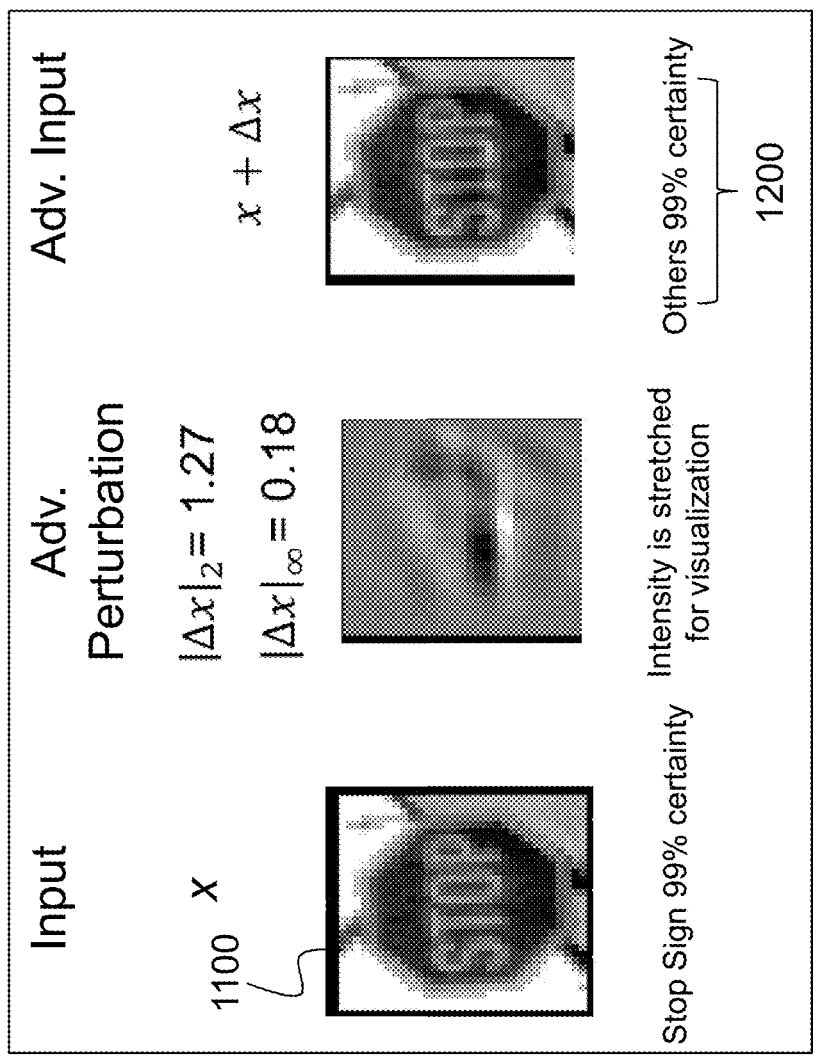
FIG. 12 is an illustration of a sample attack on a stop-sign input image according to some embodiments of the present disclosure.

For the threat model, the Carlini and Wagner (CW) attack (see Literature Reference No. 3) was used in a white-box setting with $l_2$-norm constraints. FIG. 12 shows a sample attack on a stop-sign input image (element 1100) together with the $l_2$ and $l_\infty$ norms of the perturbation. The attacked image (element 1100) is visually similar to a stop sign, but the standard CNN confidently misclassified the image as others (element 1200) (i.e., no stop sign). For the baseline defense, Madry's defense (see Literature Reference No. 8) was adapted and a separate standard CNN was trained, which is required to be resistant to the CW attack.

Figure 13:
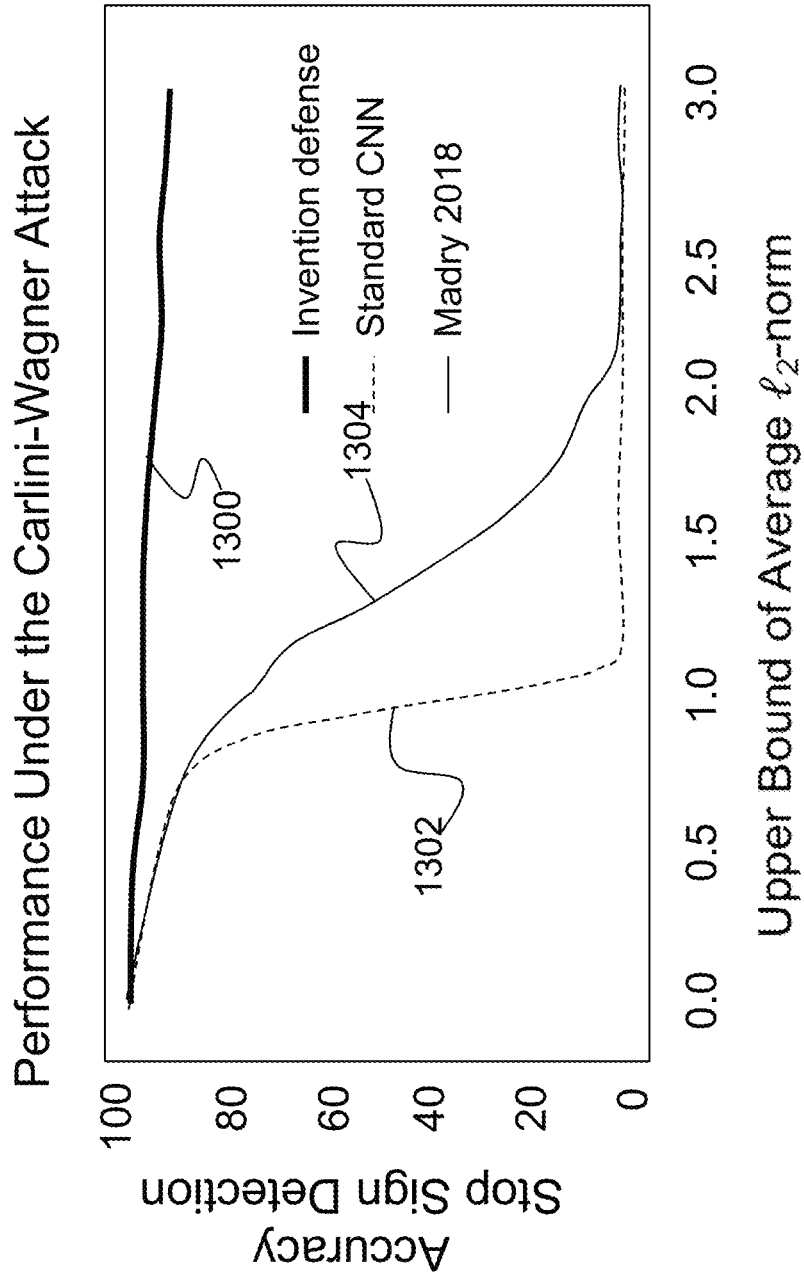
FIG. 13 is an illustration of the Carlini-Wagner attacking fooling a convolutional neural network (CNN) according to some embodiments of the present disclosure.

Then, all systems were attacked with varying attack strength (i.e., increasing upper-bound of the average $l_2$-norm of the adversarial perturbation), and the performance of each system was measured. For classification, the invention's defense increased the computational cost by about 2× compared to the standard CNN (still fast: two milliseconds (msec) per image using one graphic processing unit (GPU)), and training the defense of the system described herein was twice as fast as Madry's. As depicted in the plot in FIG. 13, the invention described herein (represented by bold solid curve (element 1300)) demonstrated a much higher accuracy compared to both a standard CNN (represented by dashed curve (element 1302)) and Madry's defense (represented by unbolded solid curve (element 1304), particularly for strong attacks. Various strengths of the attack were tested.

FIG. 14 includes a table of deficiencies of existing machine vision systems and how the system and method described herein addresses these deficiencies. For instance, open ended decision boundaries of existing systems are improved with hardened decision boundaries of the present invention. In addition, modeling complex objects was improved by decomposing a complex object into simpler, semantically meaningful components in the present invention. Furthermore, current deep neural networks still use a bag-of-attribute representation of objects, meaning that the geometric relationship between different object parts is discarded. In contrast, the present invention learns object part relationships and iteratively checks for expected parts and discovers inconsistencies using foveated hypothesis verification.

Adversarial attacks on machine vision systems pose a major threat on industries relying on automated vision. Self-driving cars, for instance, heavily rely on machine vision systems as their perception front. Drones also rely on reliable machine vision systems for various tasks including navigation and intelligence, surveillance, and reconnaissance (ISR). A machine-vision system that is robust to adversarial attacks would be significantly useful in various applications, including ISR and autonomous driving. Once a verified hypothesis has been obtained (FIG. 10, element 1000), the system described herein labels one or more objects in an input image with high accuracy. Once the object is labeled, the present invention can generate a command to control an action performed by an autonomous vehicle/platform (element 1002). For instance, the system and method according to embodiments of the present disclosure can be used in automatic control of an autonomous platform, such as a robot, autonomous self-driving ground vehicle, and unmanned aerial vehicle (UAV). Non-limiting examples of devices that can be controlled via the processor (FIG. 1, element 104) include a motor vehicle or a motor vehicle component (electrical, non-electrical, mechanical), such as a brake, a steering mechanism, suspension, or safety device (e.g., airbags, seatbelt tensioners, etc.). For instance, upon labeling and, thus identification, of an object in the input image, the action to be performed can be a driving operation/maneuver (such as steering or another command) in line with driving parameters in accordance with the now labeled object. For example, if the system recognizes a bicyclist, another vehicle, or a pedestrian in the environments surrounding the autonomous driving system/vehicle, the system described herein can cause a vehicle maneuver/operation to be performed to avoid a collision with the bicyclist or vehicle (or any other object that should be avoided while driving). The system can cause the autonomous vehicle to apply a functional movement response, which may be the task to be performed, such as a braking operation followed by a steering operation (etc.), to redirect vehicle away from the object, thereby avoiding a collision.

Other appropriate actions may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous platform given the particular object assigned a label.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for object detection that is robust to adversarial attacks, the system comprising:
one or more processors and a non-transitory computer-readable medium having executable instructions encoded thereon such that when executed, the one or more processors perform operations of:
generating an initial hypothesis of an identity of an object in an input image using a sparse convolutional neural network (CNN) and a distribution aware classifier;
performing a foveated hypothesis verification process, wherein performing the foveated hypothesis verification process comprises identifying a region of the input image that supports the initial hypothesis;
using a part-based classifier, predicting an identity of a part of the object in the region of the input image;
determining an attack probability for the predicted identity of the part;
updating the initial hypothesis based on the predicted identity of the part and the attack probability;
performing the foveated hypothesis verification process and updating of hypotheses until a hypothesis reaches a certainty threshold;
labeling the object based on the hypothesis that reached the certainty threshold; and
controlling an action performed by an autonomous platform based on the labeling of the object.

2. The system as set forth in claim 1, wherein predicting the identity of a part of the object comprises:
performing unsupervised part extraction to dissect the input image into a plurality of parts;
generating a plurality of clusters of parts by performing unsupervised clustering of the plurality of parts;
for each cluster of parts, learning an autoencoder model and storing each autoencoder model as prior knowledge; and
recognizing parts of input images using the stored autoencoder models.

3. The system as set forth in claim 1, wherein the foveated hypothesis verification process further comprises:
receiving the input image, the predicted identities of parts, and a current hypothesis;
using a recurrent neural network with long-short-term-memory, outputting a next region of the input image that supports the current hypothesis; and
sending the next region to the part-based classifier.

4. The system as set forth in claim 1, wherein the distribution aware classifier is based on generative models that capture a decision boundary by encoding distribution of a set of training data.

5. The system as set forth in claim 1, wherein the one or more processors further perform operations of:
obtaining an attention map from the sparse CNN;
using the updated hypothesis, updating the attention map; and
controlling the foveated hypothesis verification process using the updated attention map.

6. The system as set forth in claim 1, wherein the autonomous platform is a vehicle, and wherein the one or more processors further perform an operation of causing the vehicle to perform a driving operation in accordance with the labeling of the object.

7. A computer program product for object detection that is robust to adversarial attacks, the computer program product comprising:
a non-transitory computer-readable medium having executable instructions encoded thereon, such that upon execution of the instructions by one or more processors, the one or more processors perform operations of:
generating an initial hypothesis of an identity of an object in an input image using a sparse convolutional neural network (CNN) and a distribution aware classifier;
performing a foveated hypothesis verification process, wherein performing the foveated hypothesis verification process comprises identifying a region of the input image that supports the initial hypothesis;
using a part-based classifier, predicting an identity of a part of the object in the region of the input image;

determining an attack probability for the predicted identity of the part;
updating the initial hypothesis based on the predicted identity of the part and the attack probability;
performing the foveated hypothesis verification process and updating of hypotheses until a hypothesis reaches a certainty threshold;
labeling the object based on the hypothesis that reached the certainty threshold; and
controlling an action performed by an autonomous platform based on the labeling of the object.

8. The computer program product as set forth in claim 7, wherein predicting the identity of a part of the object comprises:
performing unsupervised part extraction to dissect the input image into a plurality of parts;
generating a plurality of clusters of parts by performing unsupervised clustering of the plurality of parts;
for each cluster of parts, learning an autoencoder model and storing each autoencoder model as prior knowledge; and
recognizing parts of input images using the stored autoencoder models.

9. The computer program product as set forth in claim 7, wherein the foveated hypothesis verification process further comprises:
receiving the input image, the predicted identities of parts, and a current hypothesis;
using a recurrent neural network with long-short-term-memory, outputting a next region of the input image that supports the current hypothesis; and
sending the next region to the part-based classifier.

10. The computer program product as set forth in claim 7, wherein the distribution aware classifier is based on generative models that capture a decision boundary by encoding distribution of a set of training data.

11. The computer program product as set forth in claim 7, further comprising instructions for causing the one or more processors to perform operations of:
obtaining an attention map from the sparse CNN;
using the updated hypothesis, updating the attention map; and
controlling the foveated hypothesis verification process using the updated attention map.

12. A computer implemented method for object detection that is robust to adversarial attacks, the method comprising an act of:
causing one or more processors to execute instructions encoded on a non-transitory computer-readable medium, such that upon execution, the one or more processors perform operations of:
generating an initial hypothesis of an identity of an object in an input image using a sparse convolutional neural network (CNN) and a distribution aware classifier;
performing a foveated hypothesis verification process, wherein performing the foveated hypothesis verification process comprises identifying a region of the input image that supports the initial hypothesis;
using a part-based classifier, predicting an identity of a part of the object in the region of the input image;
determining an attack probability for the predicted identity of the part;
updating the initial hypothesis based on the predicted identity of the part and the attack probability;
performing the foveated hypothesis verification process and updating of hypotheses until a hypothesis reaches a certainty threshold;
labeling the object based on the hypothesis that reached the certainty threshold; and
controlling an action performed by an autonomous platform based on the labeling of the object.

13. The method as set forth in claim 12, wherein predicting the identity of a part of the object comprises:
performing unsupervised part extraction to dissect the input image into a plurality of parts;
generating a plurality of clusters of parts by performing unsupervised clustering of the plurality of parts;
for each cluster of parts, learning an autoencoder model and storing each autoencoder model as prior knowledge; and
recognizing parts of input images using the stored autoencoder models.

14. The method as set forth in claim 12, wherein the foveated hypothesis verification process further comprises:
receiving the input image, the attention map, the predicted identities of parts, and a current hypothesis;
using a recurrent neural network with long-short-term-memory, outputting a next region of the input image that supports the current hypothesis; and
sending the next region to the part-based classifier.

15. The method as set forth in claim 12, wherein the distribution aware classifier is based on generative models that capture a decision boundary by encoding distribution of a set of training data.

16. The method as set forth in claim 12, wherein the one or more processors further perform operations of:
obtaining an attention map from the sparse CNN;
using the updated hypothesis, updating the attention map; and
controlling the foveated hypothesis verification process using the updated attention map.

17. The method as set forth in claim 12, wherein the autonomous platform is a vehicle, and wherein the one or more processors further perform an operation of causing the vehicle to perform a driving operation in accordance with the labeling of the object.

* * * * *